United States Patent [19]

Ohsawa

[11] Patent Number: 5,771,454
[45] Date of Patent: Jun. 23, 1998

[54] BASE STATION ALLOCATION METHOD FOR MOBILE RADIO COMMUNICATION SYSTEM

[75] Inventor: Tomoki Ohsawa, Tokyo, Japan

[73] Assignee: NEC Corporation, Japan

[21] Appl. No.: 611,563

[22] Filed: Mar. 6, 1996

[30] Foreign Application Priority Data

Mar. 10, 1995 [JP] Japan .................................... 7-079848

[51] Int. Cl.⁶ ...................................................... H04Q 7/36
[52] U.S. Cl. ............................. 455/452; 455/62; 455/63; 455/449
[58] Field of Search ................................. 455/34.1, 33.4, 455/62, 63, 54.1, 33.1, 56.1, 422, 447, 448, 449, 450, 451, 452, 453, 454, 509, 516, 517, 524

[56] References Cited

U.S. PATENT DOCUMENTS

| | | | |
|---|---|---|---|
| 5,263,176 | 11/1993 | Kojima et al. | 455/63 |
| 5,280,630 | 1/1994 | Wang | 455/67.3 |
| 5,396,649 | 3/1995 | Hamabe | 455/34.1 |
| 5,437,054 | 7/1995 | Rappaport et al. | 455/447 |
| 5,452,471 | 9/1995 | Leopold et al. | 455/449 |
| 5,483,666 | 1/1996 | Yamada et al. | 455/454 |
| 5,507,008 | 4/1996 | Kanai et al. | 455/34.1 |
| 5,613,200 | 3/1997 | Hamabe | 455/62 |

FOREIGN PATENT DOCUMENTS

| | | | |
|---|---|---|---|
| 4-124920 | 4/1992 | Japan | 455/34.1 |
| 4-351126 | 12/1992 | Japan . | |

*Primary Examiner*—Reinhard J. Eisenzopf
*Assistant Examiner*—Lester G. Kincaid
*Attorney, Agent, or Firm*—Ostrolenk, Faber, Gerb & Soffen, LLP

[57] ABSTRACT

A channel assignment method wherein, when cover areas of base stations in a mobile radio communication system of the cellular system hierarchically overlap each other, communication channels are used commonly by the hierarchies to achieve effective utilization of frequencies by dynamic channel assignment. When a request for communication occurs, communication channels to which different selection orders between different hierarchies are applied are checked in terms of the channel quality based on the selection order, and a channel which exceeds a certain quality at first is assigned to the request for communication, but when a channel with which a required quality is obtained cannot be found in one of the hierarchies, selection of a channel is performed for another hierarchy by similar operations. When a request for communication arises, each base station performs selection from within the same hierarchy, and in this instance, a channel with which selection is to be begun is offset between the different hierarchies. Each base station controls the offset value based on a blocking occurrence value and/or a hand-over failure occurrence number of the base station so that it may be decreased in a hierarchy whose value or values mentioned are comparatively high.

12 Claims, 7 Drawing Sheets

BASE STATION ALLOCATION METHOD FOR MOBILE RADIO COMMUNICATION SYSTEM

BACKGROUND OF THE INVENTION

1. Field of the Invention:

This invention relates to a channel assignment method for a cellular mobile radio communication system.

2. Description of the Related Art:

In a mobile radio communication system of a large capacity such as a land mobile radio telephone system, a service area of it is covered by a plurality of base stations, and the same channel is repetitively used between those base stations between which no interference disturbance occurs in order to effectively utilize frequencies. The system of the type just described is called cellular system.

In recent years, in order to increase the number of subscribers which can be accommodated in a land mobile radio telephone system, employment of a cellular system having a small service area called micro cell has been and is being investigated. While employment of micro cells increases the number of subscribers, since the cost required for installation of a base station per unit area increases, it is not considered to be practical to construct all areas using micro cells. As a realistic solution, for a land mobile radio communication system, a hierarchical construction method wherein such an area which includes a comparatively large number of subscribers as shown in FIG. 5 is formed using micro cells and the overall area of the land mobile radio communication system is covered by a macro cell which has a larger service area than a micro cell in such a manner as to cover also the area in which the service is provided by micro cells.

As a channel assignment method which is used by each base station in a land mobile radio telephone system, there is a method called dynamic channel assignment wherein a channel in which no interference disturbance occurs is selectively used for each communication.

Although the dynamic channel assignment method requires a complicated control method or a complicated apparatus construction, it is advantageous in that a comparatively large number of subscribers can be accommodated since any channel can be used only if no interference disturbance occurs. Accordingly, employment of the dynamic channel assignment method is increasing. Also in a hierarchical cellular system, a land mobile radio telephone system can increase the number of subscribers which can be accommodated by employing a dynamic channel assignment method which is conventionally used. This is effective from the point of view of effective utilization of frequencies.

An example of a conventional dynamic channel assignment method is disclosed, for example, in Japanese Patent Laid-Open Application No. Heisei 4-351126 and is shown in FIG. 1. Referring to FIG. 1, a base station provided in each of a plurality of cells operates so that it selects, in response to a call request from a mobile station, a communication channel from within all communication channels in accordance with the same procedure common to all cells (steps 803, 809), compares an expectation/interference radio power ratio of the selected communication channel with a predetermined value (steps 804 to 806), and assigns the communication channel to the call request of the mobile station when the expectation/interference radio power ratio is equal to or higher than the predetermined value (step 807).

It is assumed that the land mobile radio telephone system of Japanese Patent Laid-Open Application No. Heisei 4-351126 mentioned above includes totaling N communication channels and each base station selects a communication channel preferentially beginning with communication channel #1. Where each base station operates in this manner, the frequency of use of a communication channel in the land mobile radio telephone system is highest with communication channel #1 and decreases toward communication channel #n. Accordingly, in whichever base station or mobile station the interference radio power level of a free communication channel is measured, the tendency that the interference radio power level is highest with communication channel #1 and decreases toward communication channel #n is observed.

If a communication channel is selected in this situation preferentially beginning with communication channel #1, then the land mobile radio telephone system assigns a communication channel whose expectation/interference radio power ratio has a comparatively small margin.

Further, the land mobile radio telephone system is inclined to assign a communication channel having a high interference radio power level and having a high degree of preference to a mobile station in the proximity of a base station since the expectation radio power level is sufficiently high but assign a communication channel of a low degree of preference to a mobile station spaced away from a base station since the expectation radio power level is low. Accordingly, in the land mobile radio telephone system, the distances between base stations and mobile stations which are used for communication are leveled to similar distances, and channel assignment which is high in frequency utilization efficiency in that channels having high degrees of preference are repetitively used frequently by mobile stations in the proximity of base stations while channels having low degrees of preference are used after longer repetition intervals by mobile stations spaced away from base stations is realized.

The dynamic channel assignment method described above is applied to a cellular system of one hierarchy.

A control method wherein, where the dynamic channel assignment method is applied to a cellular system in which a service area is covered hierarchically by micro cells and a macro cell and a same communication channel is used in the two hierarchies, the efficiency is improved also between the hierarchies is considered here.

In this instance, in the land mobile radio telephone system, since the same preferential order is used in the two hierarchies, communication channel #1 is liable to be used in the highest frequency.

In the land mobile radio telephone system, however, if the macro cell can use communication channel #1 at the highest frequency, then interference in communication channel #1 occurs in the hierarchy of micro cells. Consequently, communication channel #1 cannot be repetitively used in a high frequency in the hierarchy of micro cells.

The interference between the hierarchies disturbs such an order of the land mobile radio telephone system as the entire system that it uses a channel of a higher degree of preference in a higher degree of repetition but uses a channel of a lower degree of preference after a longer repetition interval. As a result, the land mobile radio telephone system suffers from a problem that it cannot accommodate a great number of subscribers.

SUMMARY OF THE INVENTION

Accordingly, it is an object of the present invention to provide a channel assignment method for a land mobile radio telephone system wherein, eliminating the problem described above, where cover areas of base stations of the cellular system overlap hierarchically, communication channels are used commonly between different hierarchies to achieve effective utilization of frequencies by dynamic channel assignment to increase the number of subscribers which can be accommodated in the land mobile radio telephone system.

In order to attain the object described above, according to the present invention, there is provided a channel assignment method for a cellular mobile radio communication system wherein a base station provided in each of a plurality of cells selects a communication channel from among all communication channels in response to a request for communication and assigns the communication channel to the request for communication when the expectation/ interference radio power ratio of the communication channel is equal to or higher than a predetermined value, wherein a predetermined channel selection order is assigned to the communication channels and the plurality of base stations are divided into a plurality of groups, and the base station selects a communication channel in accordance with the channel selection order beginning with an initial value having a value different for the individual groups. Preferably, the channel selection order is assigned equally to the communication channels.

Preferably, the initial value is set so that selection of a communication channel in one of the groups which involves a comparatively greater number of calls which have resulted in blocking is performed beginning with a channel of a higher preference in the channel selection order than that in the other group or groups.

The initial value may be set using a number of occurrences of failure in hand-over in place of the number of calls which have resulted in blocking.

Or, the initial value may be set using, in place of the number of calls which have resulted in blocking, a sum value of the number of calls which have resulted in blocking and the number of occurrences of failure in hand-over.

According to the present invention, a base station allocation method for a mobile radio communication system is applied to a cellular system wherein such a dynamic channel assignment method for one hierarchy as in a conventional cellular system is applied to a plurality of hierarchies. Where totaling N communication channels are involved, each base station operates in accordance with a channel selection order set for the communication channels. Further, the base station successively searches, for each cell, the channels for a usable channel beginning with the highest preference in channel selection order to select a communication channel.

Since the base station allocation method for a mobile radio communication system uses, in each base stations, a communication channel having a comparatively high preference in channel selection order in a comparatively high frequency, if the same channel selection order is set to the different base stations, then the mobile radio communication system operates so as to realize channel assignment which is high in frequency utilization efficiency in that channels having high degrees of preference are repetitively used frequently by mobile stations in the proximity of base stations while channels having low degrees of preference are used after longer repetition intervals by mobile stations spaced away from base stations.

In the present invention, however, the base station allocation method for a mobile radio communication system is constructed such that, in order to prevent interference between the hierarchies, which is a problem of a conventional dynamic channel system, a communication channel which is used in a comparatively high frequency in one hierarchy is used in a comparatively low frequency in the other hierarchy.

In the present invention, the base station allocation method for a mobile radio communication system sets a channel selection order applied to the communication channels commonly to the base stations and divides the base stations into a plurality of groups of different hierarchies. Then, as described above an offset value (initial value) is provided for the channel selection order for each group so that a communication channel having a comparatively high frequency in use in one group may be used in a comparatively low frequency in the other group.

Where the channel selection orders are set in this manner, a communication channel which is used in a high frequency in one hierarchy is not used at all in the other hierarchy. Consequently, interference from the other hierarchy is eliminated.

Accordingly, the base station allocation method for a mobile radio communication system realizes the characteristic of the dynamic channel method that channels having high degrees of preference are repetitively used frequently by mobile stations in the proximity of base stations while channels having low degrees of preference are used after longer repetition intervals by mobile stations spaced away from base stations.

With the base station allocation method for a mobile radio communication system, the characteristic of the conventional dynamic channel system is realized in each hierarchy since, in the other hierarchy to which offsetting is applied and in which channel selection has been started, offset is still reduced because the frequency in use in the other hierarchy is low whereas channels higher in preference degree than the channels to which offsetting is applied are used in higher frequencies in use.

Further, according to the present invention, as control information for the offset value, the number of occurrences of call blocking obtained per each unit time for each base station is used to control the offset value optimally to optically distribute the channels to be used in the individual hierarchies. Since the number of required channels increases as the offset value increases, the offset value is controlled so that the distribution of the channels between the hierarchies may be relatively great so as to make the blocking probability of the entire system uniform.

Further, according to the present invention, the number of occurrences of failure in hand-over is used in place of the control information for the offset value. This is an application of the fact that the cause of failure in hand-over relates to shortage of channels. As the number of occurrences of failure in hand-over in a hierarchy or in a cell increases, the shortage in number of channels increases. Accordingly, the offset value of such a hierarchy or cell is controlled so that selection of a channel may be begun with a channel having a preference in order as high as possible so as to make the probability in failure in hand-over uniform in the entire system.

Further, according to the present invention, a sum value of the control information for the offset value and the probability in failure in hand-over is used.

DESCRIPTION OF THE PREFERRED EMBODIMENTS

Embodiments of the present invention will be described below with reference to the drawings.

[Embodiment 1]

Figure 5:
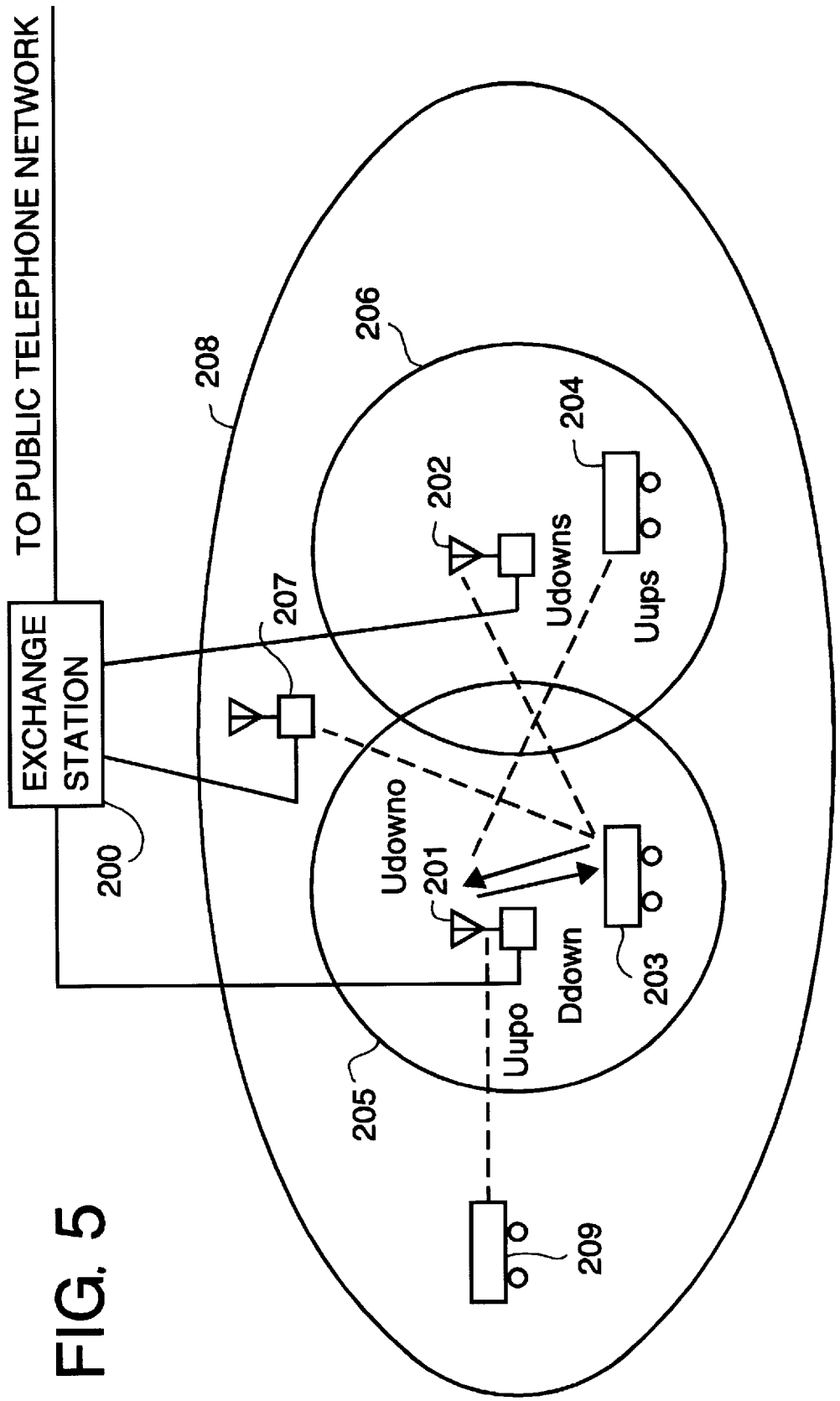
FIG. 5 is a view showing an example of a construction of a hierarchical cell structure of a group for the plurality of base stations of a cellular mobile radio communication system and would be the same figure for a conventional hierarchical cell structure of a cellular mobile radio communication system.

A first embodiment of the present invention is described in connection with a construction of a mobile radio communication system shown in FIG. 5. FIG. 5 shows an example of a construction of a mobile ratio communication system in which a channel assignment method in which two hierarchies of micro cells and a macro cell are involved is employed.

As shown in FIG. 5, the mobile radio communication system includes exchange station 200, a plurality of base stations 201, 202, 207 and so forth, and a plurality of mobile stations 203, 204, 209 and so forth. Base stations 201 and 202 are provided in micro cells 205 and 206, respectively, and base station 207 is provided in macro cell 208.

Further, in FIG. 5, reference character Dup denotes the up expectation radio power level in base station 201, Uups denotes the up interference radio power level from the same hierarchy in base station 201, Ddown denotes the down expectation radio power level in mobile station 203, Ddowns denotes the down interference radio power level in mobile station 203, Uupo denotes the up interference radio power level from the other hierarchy in base station 201, and Udowno denotes the down interference radio power level from the other hierarchy in mobile station 203.

When a request for communication is generated in mobile station 203 which is present in the cell of base station 201, the base station allocation method for the mobile radio communication system selects and uses a communication channel with which the up expectation/interference radio power ratio (Dup—Uups—Unpo) in base station 201 and the down expectation/interference radio power ratio (Ddown—Udowns—Udowno) exhibit values higher than a predetermined value.

In the present embodiment, the order of channel selection of communication channels is determined in each group (hierarchy) so that a channel having a high preference in order is repetitively used frequently by mobile stations in the proximity of each base station and a communication channel which is used in a frequency as high as possible between the hierarchies is not used in the other hierarchy, which is the characteristic of the dynamic channel assignment method of the base station allocation method for a mobile radio communication system.

As an example, where two hierarchies are involved, it is assumed that the channel selection order of communication channels is such that, in the first hierarchy (micro cells), the communication channels are selected in the order of the communication channel number (represented by "#n", where n=1, 2, 3, . . . ) whereas, in the second hierarchy (macro cell), the communication channels are selected in the reverse order to the communication channel number.

Figure 1:
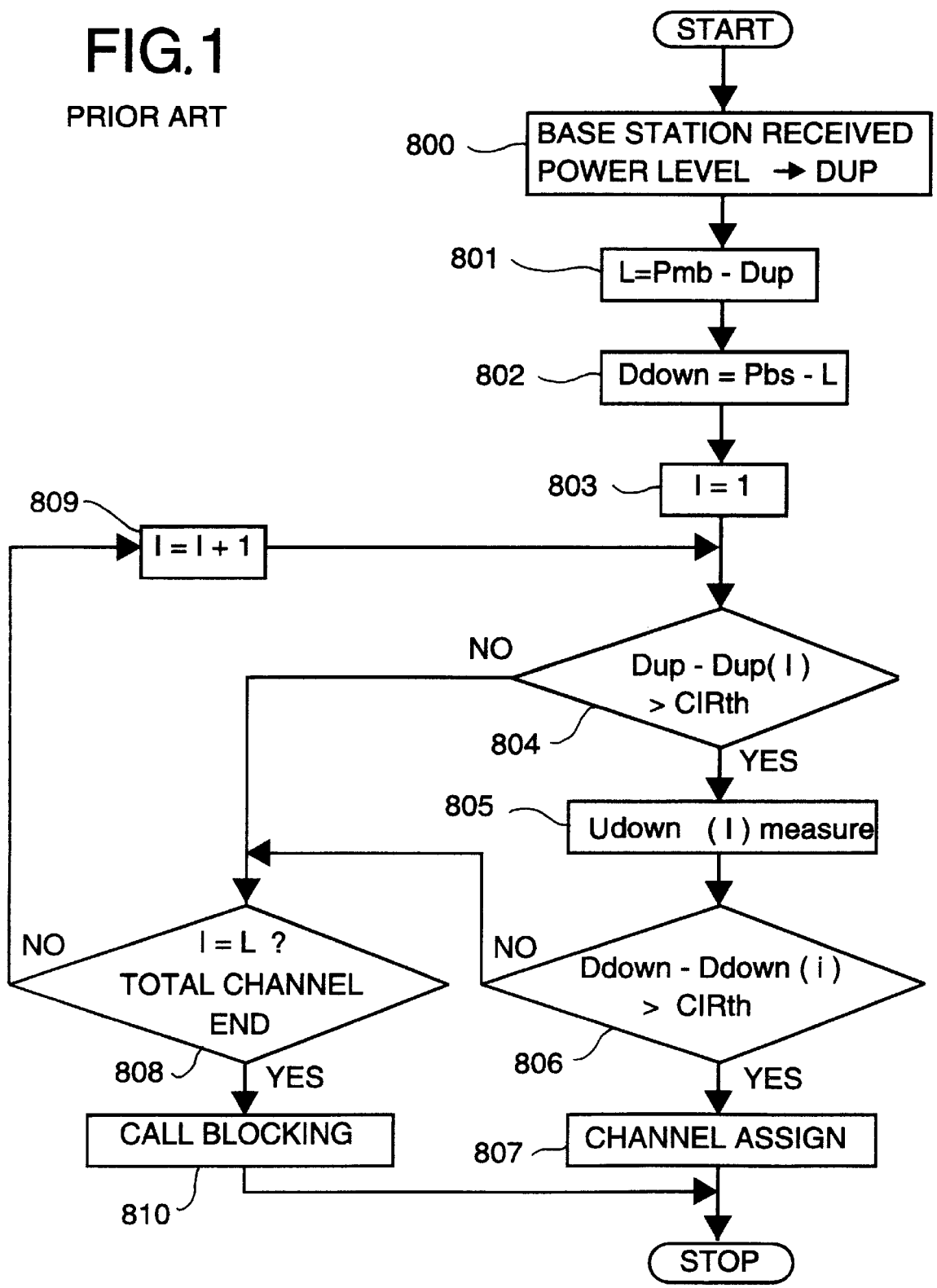
FIG. 1 is a view illustrating a control of a conventional dynamic channel assignment method.
Figure 2:
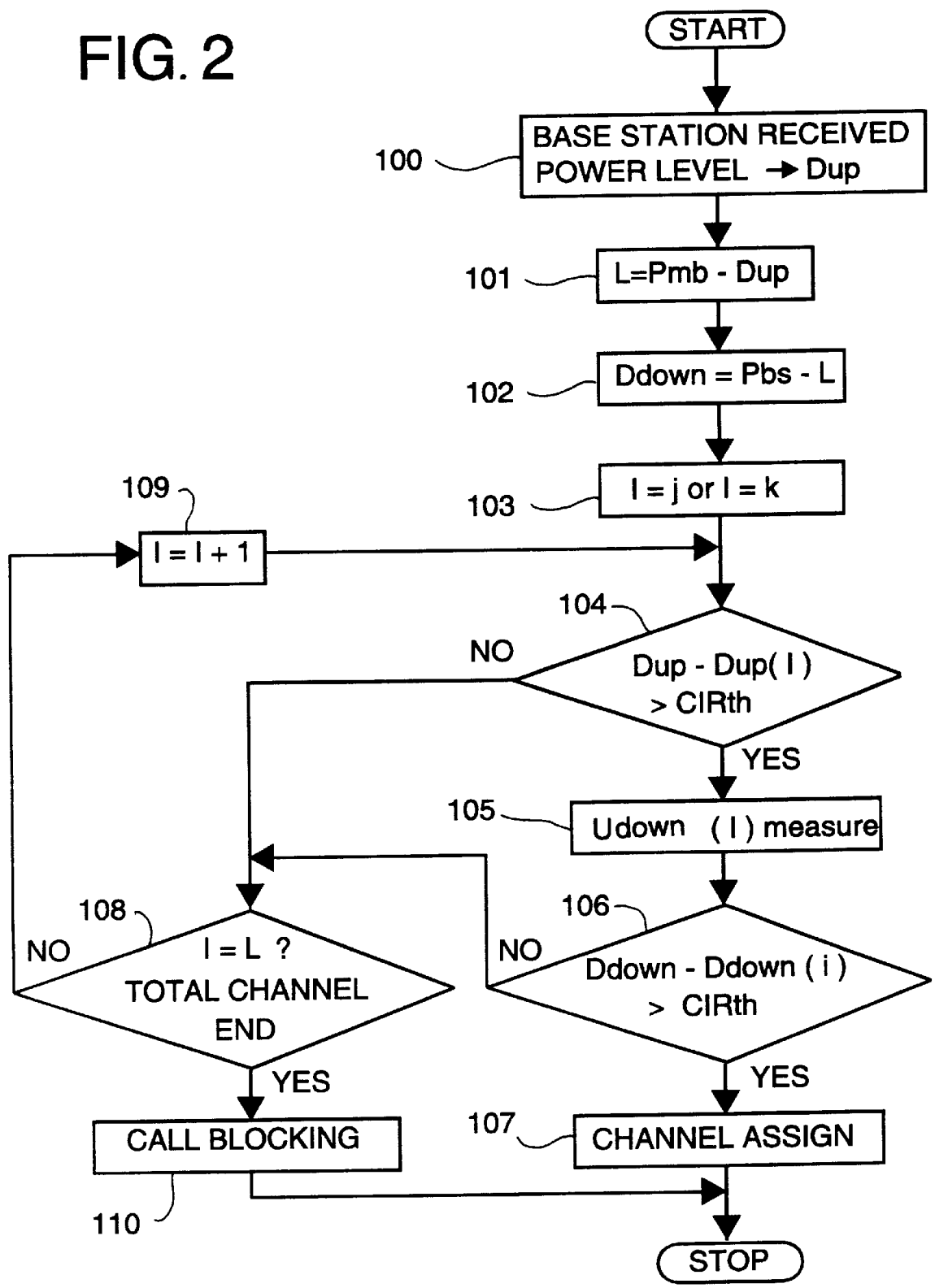
FIG. 2 is a flow chart illustrating a control of a base station in a first embodiment of the present invention.

FIG. 2 is a flow chart illustrating a control of each of the base stations in the micro cell hierarchy and the macro cell hierarchy in the channel assignment method of the present embodiment.

The base station periodically receives and stores the value of the interference radio power level (up interference radio power levels from the same hierarchy and the other hierarchy) Uups(i)+Uupo (i=1, 2, . . . ) of each free communication channel. It is assumed that the transmission radio power (referred to as "Pms") of a mobile station and the transmission radio power (referred to as "Pbs") of the base station are known.

As seen from FIG. 2, when a request for communication is generated or when a call request received by a control channel of the base station is generated, the base station stores the reception radio power level of the call request signal (when a call is originated from a mobile station) or a call response signal (when a call is terminated at a mobile station) received by the (Dup) (step 100).

Then, the base station subtracts up expectation radio power level Dup from transmission power Pms of the mobile station and sets the resulted difference as a propagation loss (referred to as "L") between the base station and the mobile station (step 101).

Since it is presumed that the reversibility principle stands between a reverse link and a forward link and they have equal propagation loss L, the base station can calculate the down expectation radio power level (Ddown) in the mobile station by subtracting L from transmission radio power Pbs of the base station.

Here, the base station sets parameter i for the identification of a communication channel to j for the micro cell hierarchy but to k for the macro cell hierarchy (step 103). The values of j and k are initially set to j=1 and k=1+l (l>0) offsetting the macro cell.

The base station compares a value obtained by subtracting up interference radio power level Uups(1)+Uupo(1) of communication channel #1 (in the case of the micro cell hierarchy) or channel #(1+l) (in the case of the macro cell hierarchy) from Dup, that is, the up expectation/interference radio power ratio, with a predetermined value (referred to as "CIRth") (step 104).

When the up expectation/interference radio power ratio is equal to or higher than CIRth, the base station instructs the mobile station to measure down interference radio power level Udowns(1)+Udowno(1) of communication channel #1 and receives a result from the mobile station (step 105).

Then, the base station compares a value obtained by subtracting Udowns(1)+Udowno(1) from Ddown, that is, the down expectation/interference radio power ratio, with CIRth (step 106).

As a results, if also the down expectation/interference radio power ratio is equal to or higher than CIRth, then the base station assigns communication channel #1 or channel #(1+l) to the request for communication (step 107).

When the up expectation/interference radio power ratio or the down expectation/interference radio power ratio of communication channel #1 or channel #(1+l) is lower than CIRth, the base station increments the parameter by 1 to select next channel #2 or channel #(2+1) (step 109).

Thereafter, the base station performs discrimination of an interference condition by repeating steps 104 to 106 in a similar manner as described above.

When the base station performs discrimination for the last communication channel #n (step 108), if no communication channel which can be used cannot be found, then the base station determines that call blocking has occurred (step 110).

Figure 3:
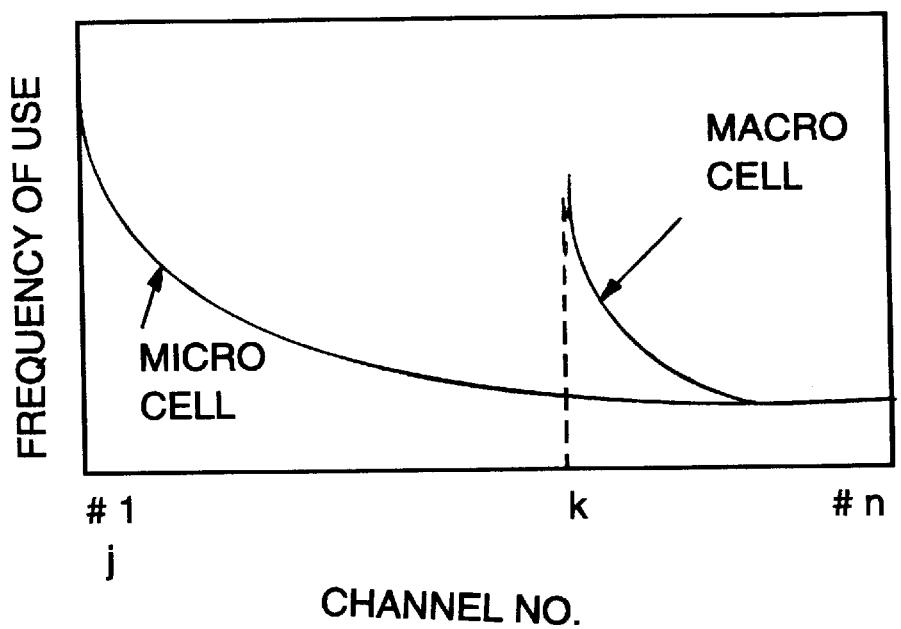
FIG. 3 is a diagram illustrating an example of a condition of frequencies in use of communication channels in the first embodiment of the present invention.

FIG. 3 indicates the frequencies in use of the channels obtained by the present embodiment. As seen from FIG. 3, the order in selection of the communication channels is such that, in the micro cells, they are used beginning with channel #1, but in the macro cell, they are used beginning with channel #k (k>1) as a result of offsetting processing.

As seen from FIG. 3, those channels which are used in high frequencies in the hierarchy to which no off-setting is applied (in the present embodiment, the micro cell hierarchy) do not suffer from interference from the macro cell hierarchy. Then, the interference of those channels which are used in the macro cell hierarchy is reduced since they are used in lower frequencies in the macro cell hierarchy, and the effect of dynamic channels appears also in the macro cell hierarchy.

Figure 4:
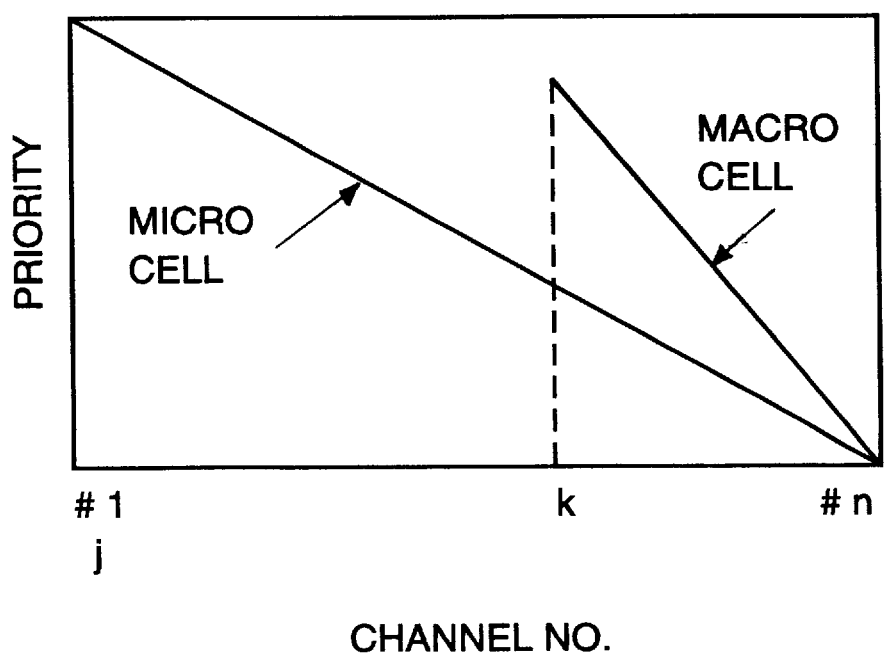
FIG. 4 is a view illustrating an example of an order of selection of channels in different hierarchies where two hierarchies are involved in the first embodiment of the present invention.

FIG. 4 illustrates manners of the order in selection (priority; preference in order) of the communication channels in the individual hierarchies. In FIG. 4, variable j represents the offset value of the micro cells and variable k represents the offset value of the macro cell, and the higher the value, the greater the offset.

[Embodiment 2]

Figure 6:
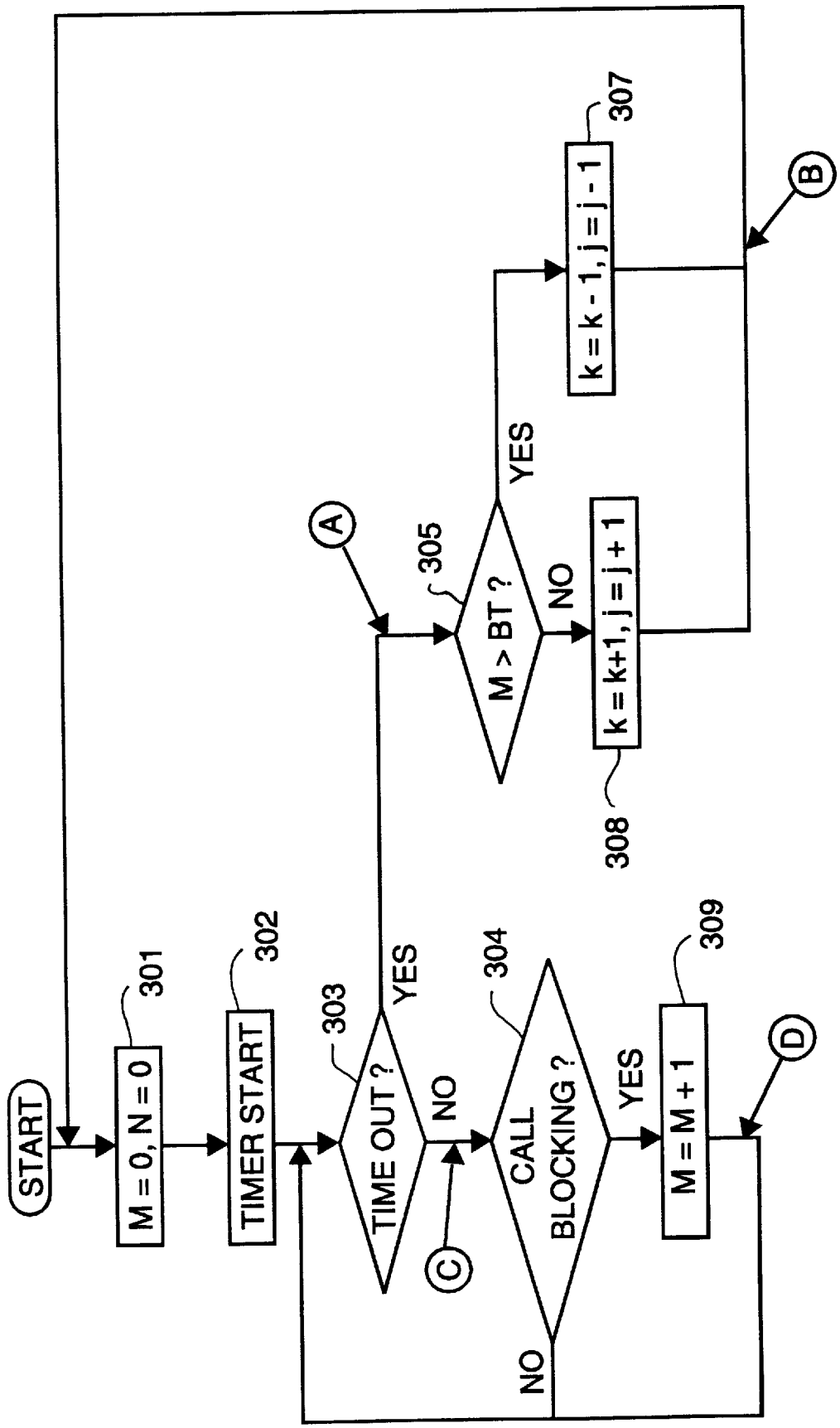
FIG. 6 is a flow chart illustrating a control in a second embodiment of the present invention.

A second embodiment of the present invention will be described below with reference to FIG. 6. FIG. 6 shows a flow chart of a control of each base station when selection of a communication channel is performed by distributed control.

As seen from FIG. 6, each base station sets variable M to zero (step 301) and starts a timer (step 302).

The base station discriminates, before a time-out of the timer occurs, whether or not call blocking has occurred (step 304), and when call blocking has occurred, the base station increments variable M.

If a time-out occurs (step 303), then the base station compares the number of occurrences of call blocking within a fixed period of time obtained as variable M with threshold value BT set in advance. This threshold value is a reference value for an average call blocking occurrence number of the entire network, and when the threshold value is exceeded, the base station reduces the offset value since channels provided to the cell are insufficient (step 307).

On the other hand, when the reference value is not reached, the base station increases the offset value (step 308) to release a channel. If the preference is provided to one of the hierarchies, then another method may be applied wherein the preference is provided to a base station of the hierarchy but the control of FIG. 6 is not performed.

Figure 7:
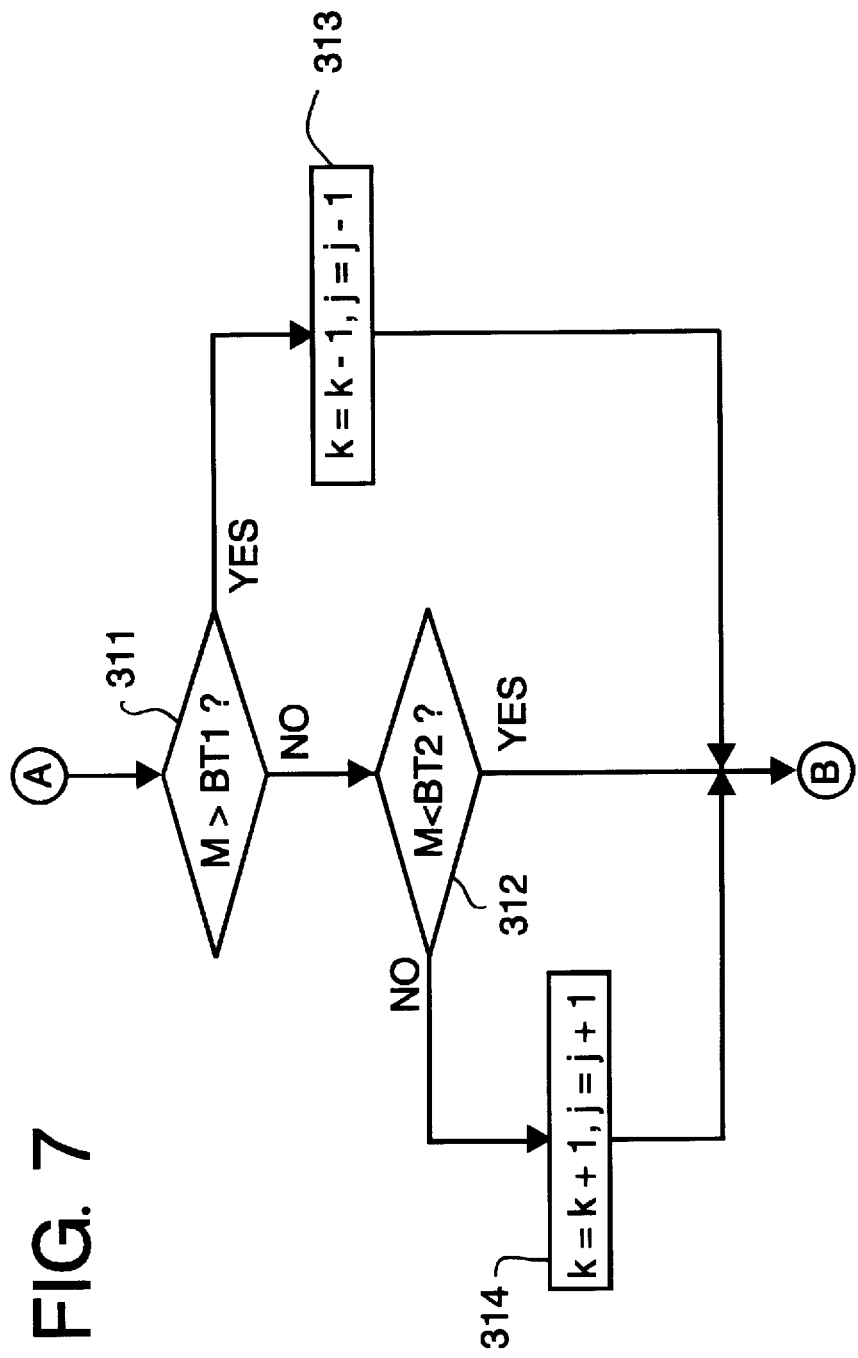
FIG. 7 is a flow chart illustrating a control where a hysteresis characteristic is involved in the second embodiment of the present invention.

FIG. 7 shows a flow chart of a control where a hysteresis characteristic is provided to the control between terminals A and B of FIG. 6. In this instance, the base station sets threshold value BT1 for an upper limit and threshold value BT2 for a lower limit in place of threshold vale BT.

Then, the base station controls the offset value so that it may fall between threshold values BT1 and BT2.

Referring now to FIG. 7, after the time-out occurs in FIG. 6 (step 303), the base station compares the offset value with the upper limit threshold value (step 311).

If the result of comparison reveals that the offset value exceeds the upper limit, then the base station discriminates that call blocking has occurred because the number of channels is insufficient, and decreases the offset value (step 313).

When the offset value does not exceed the upper limit threshold value, the base station compares the offset value with the lower limit threshold value (step 312).

The base station discriminates, when the offset value exceeds the lower limit threshold value, that the number of channels is excessively great, and increases the offset value (step 314).

Figure 8:
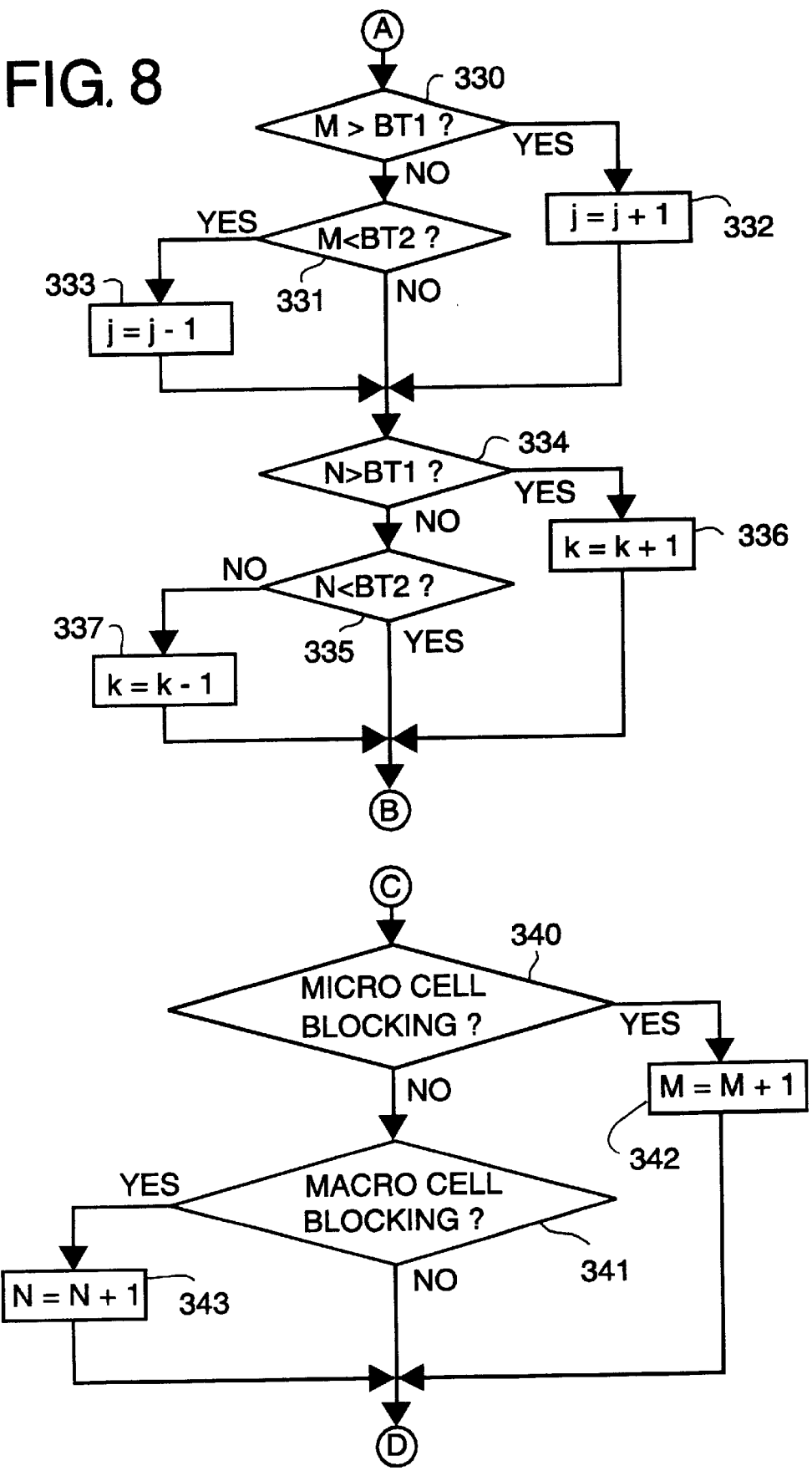
FIG. 8 is a view illustrating a control upon concentrated control in the second embodiment of the present invention.

FIG. 8 shows a flow chart of a control of a control station when the present embodiment is performed by concentrated control.

When it is determined so that functions of a control station are performed by a mobile exchange station (200 in FIG. 5), information regarding blocking of the base stations is collected to the mobile exchange station, and values of results J and K of the controls are received. In the concentrated control, each base station performs only the control of FIG. 2, but the control of FIG. 5 is not performed by each base station but is performed by the mobile exchange station. The flow of the control of the mobile exchange station is different from that of FIG. 6 in that the controls between terminals A and B and between terminals C and D of FIG. 6 are changed to those of FIG. 8.

Each base station increases variable M (step 342) if call blocking has occurred with a micro cell before a time-out of the timer occurs (step 340), and increases variable N if call blocking has occurred with the macro cell (341).

The base station uses the blocking occurrence values of the hierarchies obtained as independent variables M and N to control the offsetting after the time-out (step 303 of FIG. 6). The base station compares variables M and N with threshold values BT1 and BT2 for the upper and lower limits (steps 330, 331, 334 and 335) and controls the offset values so that they may fall between threshold values BT1 and BT2.

In the present embodiment, the base station performs a control of the offset of the macro cell at steps 330 to 333 and then performs control of the macro cell at steps 334 to 337. The controls are similar to those of FIG. 7.

[Embodiment 3]

A third embodiment of the present invention will be described below. In the present embodiment, the blocking occurrence values at step 304 of FIG. 6 of the second embodiment or at steps 340 and 341 of FIG. 8 of the second embodiment are replaced with the numbers of occurrences of failure in hand-over (switching of a line when a mobile station moves, during communication, from the area of one base station into the area of another base station) or the sum values of the blocking occurrence values and the numbers of occurrences of failure in hand-over.

While the present invention is described above in connection with the preferred embodiments thereof, the present invention is not limited to the specific embodiments described above but naturally includes various forms based on the principle of the present invention.

As described above, according to the present invention, a channel assignment method based on the cellular system of a hierarchical structure which is improved in frequency utilization efficiency can be provided by simple control and simple orthogonalization of the channel selection order.

Further, according to the present invention, by controlling an offset value, there is an advantage that a further optimum distribution of communication channels can be obtained and the entire mobile radio communication system is controlled so as to be uniformed in terms of either one or both of the blocking and the probability in failure in hand-over.

What is claimed is:

1. A dynamic channel assignment method for improving the frequency utilization efficiency of a cellular mobile radio communication system including a plurality of cells, each cell including a base station, wherein the cells are divided into a plurality of overlapping hierarchical groups, comprising the steps of:

assigning a predetermined channel selection order to the communication channels, such that an initial value of the selection order for any base station in a particular hierarchical group is different than the initial value for any base station in any other hierarchical group;

selecting a communication channel, from among all communication channels, in response to a request for communication to a base station, in accordance with the selection order and beginning with the initial value assigned to the base station; and assigning the selected communication channel to the request for communication when the expectation/ interface radio power ratio of the communication channel is equal to or higher than a predetermined value.

2. A channel assignment method as claimed in claim 1, wherein the initial value is set so that selection of a communication channel in one of the groups which involves a comparatively greater number of calls which have resulted in blocking is performed beginning with a channel of a higher preference in the channel selection order than that in the other group or groups.

3. A channel assignment method as claimed in claim 2, wherein the base station controls the initial value so as to increase the initial value when the blocking occurrence number is equal to or higher than a predetermined value set in advance, but decrease the initial value when the blocking occurrence number is lower than the predetermined value.

4. A channel assignment method as claimed in claim 3, wherein each base station assigns the channel selection order equally to the communication channels.

5. A channel assignment method as claimed in claim 2, wherein the base station counts the blocking occurrence number in a micro cell hierarchy and the blocking occurrence number in a macro hierarchy independently of each other for the individual hierarchies, compares the blocking occurrence numbers for the individual hierarchies with a predetermined value set in advance and controls an increase or decrease of the initial value based on results of the comparison.

6. A channel assignment method as claimed in claim 5, wherein each base station assigns the channel selection order equally.

7. A channel assignment method as claimed in claim 2, wherein each base station assigns the channel selection order equally.

8. A channel assignment method as claimed in claim 1, wherein the initial value is set so that selection of a communication channel in one of the groups which involves a comparatively greater number of occurrences of failure in hand-over is performed beginning with a channel of a higher preference in the channel selection order than that in the other group or groups.

9. A channel assignment method as claimed in claim 8, wherein each base station assigns the channel selection order equally.

10. A channel assignment method as claimed in claim 1, wherein the initial value is set so that selection of a communication channel in one of the groups which exhibits a comparatively high sum value of the number of calls which have resulted in blocking and the number of occurrences of failure in hand-over is performed beginning with a channel of a higher preference in the channel selection order than that in the other group or groups.

11. A channel assignment method as claimed in claim 10, wherein each base station assigns the channel selection order equally.

12. A channel assignment method as claimed in claim 1, wherein each base station assigns the channel selection order equally.

* * * * *